(12) United States Patent
Souissi et al.

(10) Patent No.: US 11,580,231 B2
(45) Date of Patent: Feb. 14, 2023

(54) METHODS AND DEVICES FOR SECURE SECRET KEY GENERATION

(71) Applicant: SECURE-IC SAS, Cesson-Sevigne (FR)

(72) Inventors: Youssef Souissi, Massy (FR); Florent Lozac'h, Trappes-en-Yvelines (FR); Adrien Facon, Paris (FR); Sylvain Guilley, Paris (FR)

(73) Assignee: SECURE-IC SAS, Cesson-Sevigne (FR)

( * ) Notice: Subject to any disclaimer, the term of this patent is extended or adjusted under 35 U.S.C. 154(b) by 0 days.

(21) Appl. No.: 17/275,163

(22) PCT Filed: Sep. 11, 2019

(86) PCT No.: PCT/EP2019/074174
§ 371 (c)(1),
(2) Date: Mar. 10, 2021

(87) PCT Pub. No.: WO2020/058050
PCT Pub. Date: Mar. 26, 2020

(65) Prior Publication Data
US 2021/0365566 A1 Nov. 25, 2021

(30) Foreign Application Priority Data
Sep. 17, 2018 (EP) .................................. 18306205

(51) Int. Cl.
*G06F 21/00* (2013.01)
*G06F 21/57* (2013.01)
(Continued)

(52) U.S. Cl.
CPC .......... *G06F 21/577* (2013.01); *H04L 9/0625* (2013.01); *H04L 9/0656* (2013.01); *H04L 9/3249* (2013.01); *H04L 9/3278* (2013.01)

(58) Field of Classification Search
CPC ... G06F 21/577; H04L 9/0625; H04L 9/0656; H04L 9/3249; H04L 9/3278;
(Continued)

(56) References Cited

U.S. PATENT DOCUMENTS 6,105,133 A * 8/2000 Fielder .................. H04L 9/3228
713/169
2013/0191799 A1* 7/2013 Yasunaka ................ G06F 30/30
716/103
(Continued)

OTHER PUBLICATIONS

Jana et al., "On the effectiveness of secret key extraction from wireless signal strength in real environments", MobiCom '09: Proceedings of the 15th annual international conference on Mobile computing and networking, pp. 321-332, Sep. 2009.*
(Continued)

*Primary Examiner* — Morshed Mehedi
(74) *Attorney, Agent, or Firm* — BakerHostetler

(57) ABSTRACT

There is provided a cryptographic key determination device for determining one or more cryptographic keys in a cryptographic device, the cryptographic device being configured to execute one or more test programs, the cryptographic device comprising one or more components (11-*i*), each component (11-*i*) being configured to generate static and dynamic data, the dynamic data being generated in response to the execution of the one or more test programs, wherein the cryptographic key determination device comprises: a data extraction unit configured to extract at least one part of the static data and at least one part of the dynamic data generated by the one or more components (11-*i*), and a key generator configured to combine the at least one part of static data and the at least one part of dynamic data, and to determine the one or more cryptographic keys by applying a cryptographic function to the combined data.

15 Claims, 2 Drawing Sheets

(51) Int. Cl.
*H04L 9/06* (2006.01)
*H04L 9/32* (2006.01)

(58) Field of Classification Search
CPC ... H04L 2209/26; H04L 9/0861; G11C 29/12; G11C 29/56016; G11C 2029/0401; G11C 2029/0407; G11C 2029/0409; G11C 2029/4402; G11C 2209/26; G11C 29/04
See application file for complete search history.

(56) References Cited

U.S. PATENT DOCUMENTS

| | | | | |
|---|---|---|---|---|
| 2013/0218828 | A1* | 8/2013 | Lingamneni | G06F 16/24552 707/602 |
| 2015/0036873 | A1* | 2/2015 | Petrovic | H04N 1/32315 382/100 |
| 2016/0048692 | A1* | 2/2016 | Fielder | H04L 63/123 713/185 |
| 2016/0269175 | A1* | 9/2016 | Cammarota | H04L 9/002 |
| 2016/0285897 | A1* | 9/2016 | Gantman | G06N 20/00 |
| 2016/0300252 | A1* | 10/2016 | Frank | G06F 16/24578 |
| 2017/0235941 | A1* | 8/2017 | Kim | G11C 29/52 726/19 |
| 2018/0060560 | A1* | 3/2018 | Waltermann | H04L 9/3226 |
| 2018/0241557 | A1* | 8/2018 | Maes | H03M 13/6356 |
| 2018/0249328 | A1* | 8/2018 | Warren | G06F 21/74 |

OTHER PUBLICATIONS

Chari, et al., "Towards Sound Approaches to Counteract Power-Analysis Attacks", Advances in Cryptology—CRYPTO, vol. 25, 1666 of the Series Lecture Notes in Computer Science, pp. 398-412, 1999.

Chari, et al., "Template Attacks", CHES 2002, vol. 2523 of the Series Lecture Notes in Computer Science, pp. 13-28, 2003.

Coron, et al., "On Boolean and Arithmetic Masking against Differential Power Analysis", Cryptographic Hardware and Embedded Systems (CHES 2000), vol. 1965 of the Series Lecture Notes in Computer Science, pp. 231-237, 2000.

Kocher, et al., "Dierential Power Analysis", Annual International Cryptology Conference, Cryptography Research, Inc., CRYPTO 1999, Advances in Cryptology, 1999.

* cited by examiner

METHODS AND DEVICES FOR SECURE SECRET KEY GENERATION

CROSS-REFERENCE TO RELATED APPLICATIONS

This application is a National Stage of International patent application PCT/EP2019/074174, filed on Sep. 11, 2019, which claims priority to foreign European patent application No. EP 18306205.8, filed on Sep. 17, 2018, the disclosures of which are incorporated by reference in their entirety.

TECHNICAL FIELD

The invention generally relates to cryptographic systems and in particular to methods and devices for determining cryptographic keys.

BACKGROUND

Cryptographic devices are used in many fields to ensure security, authentication, protection and privacy of data during their storage and/or their transmission. With the huge and continuous advances made in the fields of computer sciences and computer hardware technologies, cryptographic devices have become essential items. Low-cost, fast, and small cryptographic devices are deployed in various systems, such as communication systems and data processing systems, for many applications.

Cryptographic devices use one or more cryptographic keys to generate secured data from original data for preventing a hacker or an attacker from recovering the original data, while access to the secured data requires access to the cryptographic keys. Cryptographic devices accordingly store sensitive private data (e.g. cryptographic keys). An attack on the cryptographic hardware can have disastrous implications on data security including, for example, loss of privacy and loss of protection and security.

The target of an attacker with respect to a cryptographic device depends on the application. For example, an attacker can target learning private parameters, such as the cryptographic key(s), or try to exploit leaked information of the attacked cryptographic device without learning private parameters or damaging the normal serviceability of the system.

In secured cryptographic devices, it is intended that an attacker cannot acquire any knowledge on the private data by observing or manipulating the inputs/outputs of the units storing sensitive data or implementing cryptographic mechanisms involving sensitive private data. An attacker can try to recover sensitive data by performing an exhaustive search (e.g. an exhaustive search over the full space of cryptographic keys if the goal of the attacker is to extract one or more cryptographic keys).

Several attacks on cryptographic devices exist comprising for example hardware attacks that target the physical implementation of cryptographic algorithms and cyber-attacks that target the behavior of a cryptographic device when executing a software code/program on a processor. Exemplary physical hardware attacks comprise side-channel attacks and fault attacks.

Side-channel attacks use any physically leaked information (e.g. power consumption, processing time, electromagnetic radiations, sound and infrared radiations) that could be used by an attacker as an additional source of knowledge of the physical implementation of cryptographic mechanisms. Leaked information can reveal characteristics on the internal structure of the attacked device and on the running cryptographic mechanisms. For example, measuring power consumption of a cryptographic device over time or measuring the time required to run cryptographic mechanisms or to run computational operations for the generation of cryptographic keys might disclose information about private data.

In fault attacks, an attacker forces a cryptographic device to perform some erroneous operations, with the purpose of exploiting any leaked information during the wrong behavior of the attacked device to determine the private parameters involved during the running of the erroneous operations. Several methods for inducing fault attacks exist comprising for example supplying noisy power or clock signals, incorrect voltage, or excessive temperature.

Cyber-attacks exploit the machine-code execution performed by the processing elements/components/units to access and gain control of attacked devices. In particular, memory-based attacks on hardware/software designs rely on corrupting memory addresses (locations) to hijack control flow. For example, arbitrary program execution can be achieved by corrupting a code/program memory location (as example the return address).

Several protection techniques against hardware attacks and cyber-attacks exist.

Side-channel attacks can be countered by providing cryptographic mechanisms and algorithms that run in a constant time or developing cryptographic programs that operate under a constant program flow, regardless of the secured data. These techniques allow mitigating side-channel attacks. However, their practical implementation is not feasible in applications where the hardware resources (storage space, processing capabilities) are limited due for example to cost or size considerations. Besides, the value of the data manipulated by the algorithm can also leak. Therefore, other side-channel mitigation solutions have been disclosed in:

"S. Chari, C. S. Jutla, J. R. Rao, and P. Rohatgi. Towards Sound Approaches to Counteract Power-Analysis Attacks. Advances in Cryptology-CRYPTO. Volume 25 1666 of the Series Lecture Notes in Computer Science. Pages 398-412. 1999";

"S. Chari, J. R. Rao, and P. Rohatgi. Template Attacks. Cryptographic Hardware and Embedded Systems (CHES). Volume 2523 of the Series Lecture Notes in Computer Science. Pages 13-28. 2003", and "J-S. Coron and L. Goubin. On Boolean and Arithmetic Masking against Differential Power Analysis. Cryptographic Hardware and Embedded Systems (CHES). Volume 1965 of the Series Lecture Notes in Computer Science. Pages 231-237. 2000".

These solutions are based on randomization techniques such as secret splitting or masking schemes aiming at adding a protection layer to the cryptographic mechanisms through the use of random unknown numbers that prevent unintended receivers or attackers from predicting secret values from leaked information. Masking schemes are efficient in scenarios where the attacker exploits physical leaked information observed in one instant. However, for some attacks, which are based on multiple leaked information in multiple instants (such as high-order differential analysis), randomization techniques fail to inhibit attackers to successfully recover desired secret values (in "P. C. Kocher, J. Jaffe, and B. Jun. Differential Power Analysis. Advances in Cryptology-CRYPTO. Volume 1666 of the Series Lecture Notes in Computer Science. Pages 388-297. 1999").

Protections against fault attacks in hardware or software aim at helping the circuits to avoid detecting and/or correcting faults. Passive and active protections exist. Exemplary passive protections comprise the randomization of the clock cycles, bus and memory encryption. Exemplary active protections comprise the use of sensors and detectors to infer abnormal circuit behaviors.

Protections against cyber-attacks comprise:
antivirus programs used to detect/identify the presence of malware codes;
the use of canaries to detect overflows;
dynamic information flow tracking to identify and track the unsafe data;
the use of virtual memory addresses rather than physical addresses in combination with the deployment of non-executable stack and heaps, address space layout randomization, and stack canaries; such protection measures provide memory access restrictions and prevent from code injection and/or execution by attackers, and
control flow integrity based on the detection of any modifications on the flow control.

Existing protections against hardware and software attacks that target the extraction of cryptographic keys stored in/used by cryptographic devices provide a partial protection and are not sufficient to completely protect cryptographic devices.

There is accordingly a need for developing efficient cryptographic keys generation techniques that prevent from attacks that aim at recovering cryptographic keys implemented in cryptographic devices.

SUMMARY

In order to address these and other problems, there is provided a cryptographic key determination device for determining one or more cryptographic keys in a cryptographic device, the cryptographic device being configured to execute one or more test programs, the cryptographic device comprising one or more components, each component being configured to generate static and dynamic data, the dynamic data being generated in response to the execution of the one or more test programs. Advantageously, the cryptographic key determination device comprises:
a data extraction unit configured to extract at least one part of the static data and at least one part of the dynamic data generated by the one or more components, and
a key generator configured to combine the at least one part of static data and the at least one part of dynamic data, and to determine the one or more cryptographic keys by applying a cryptographic function to the combined data.

In some embodiments, the cryptographic device may be configured to execute the one or more test programs continuously.

In another embodiment, the cryptographic device may be configured to execute the one or more test programs periodically according to a predefined time interval.

In still another embodiment, the execution of the one or more test programs may be event-driven, the cryptographic device being configured to execute the one or more test programs in response to one or more events.

In yet another embodiment, the cryptographic device may be configured to execute the one or more test programs in response to an interrupt action or to a user-initiated action.

In some embodiments, the execution of one or more test programs may be implemented by the cryptographic device to perform a system boot-up test, the cryptographic device being configured to execute the one or more test programs at each system boot.

In one embodiment, the execution of one or more test programs may be implemented by the cryptographic device to perform a memory test for testing one or more memory units implemented in the cryptographic device.

In another embodiment, the execution of one or more test programs may be implemented depending on one or more test parameters, a test parameter being chosen in a group comprising a test duration and a test complexity.

A component of the one or more components may be a processor or a memory.

In particular, the key generator may be a random number generator or a physically unclonable function.

In some embodiments, the cryptographic device may be configured to use the one or more cryptographic keys in one or more applications comprising data encryption, data decryption, message authentication, and digital signatures.

Data encryption may be performed using a symmetric encryption algorithm chosen in a group comprising DES, 3DES, AES, and RC.

Alternatively, data encryption may be performed using an asymmetric encryption algorithm, the asymmetric encryption algorithm being RSA or ECDSA.

In some embodiments, the one or more cryptographic keys may be stored within the cryptographic device or shared within the cryptographic device or shared with external devices or shared with external systems.

There is further provided a method for determining one or more cryptographic keys, the method comprising:
executing one or more test programs;
generating static and dynamic data, the dynamic data being generated in response to the execution of the one or more test programs.

Advantageously, the method comprises:
extracting at least one part of the static data and at least one part of the dynamic data;
combining the at least one part of static data and the at least one part of dynamic data; and
determining the one or more cryptographic keys by applying a cryptographic function to the combined data.

Advantageously, the determination of cryptographic keys according to the various embodiments of the invention based on dynamic data representative of a dynamic behavior of cryptographic devices enables a protection of the cryptographic devices against attacks aiming at recovering the cryptographic keys. The dependency on the dynamic behavior of the cryptographic device makes an attacker required to reverse-engineer the whole system for recovering the cryptographic key(s).

Advantageously, the various embodiments of the invention provide efficient techniques for reinforcing the security and protection of cryptographic devices by increasing the difficulty of reverse-engineering aiming at extracting cryptographic keys.

Advantageously, the various embodiments of the invention provide secured initialization of cryptographic devices.

Further advantages of the present invention will become clear to the skilled person upon examination of the drawings and the detailed description, provided for illustration purposes only.

BRIEF DESCRIPTION OF THE DRAWINGS

The accompanying drawings, which are incorporated in and constitute a part of this specification, illustrate various embodiments of the invention, together with the general description of the invention given above and the detailed description of the embodiments given below.

DETAILED DESCRIPTION

Figure 1:
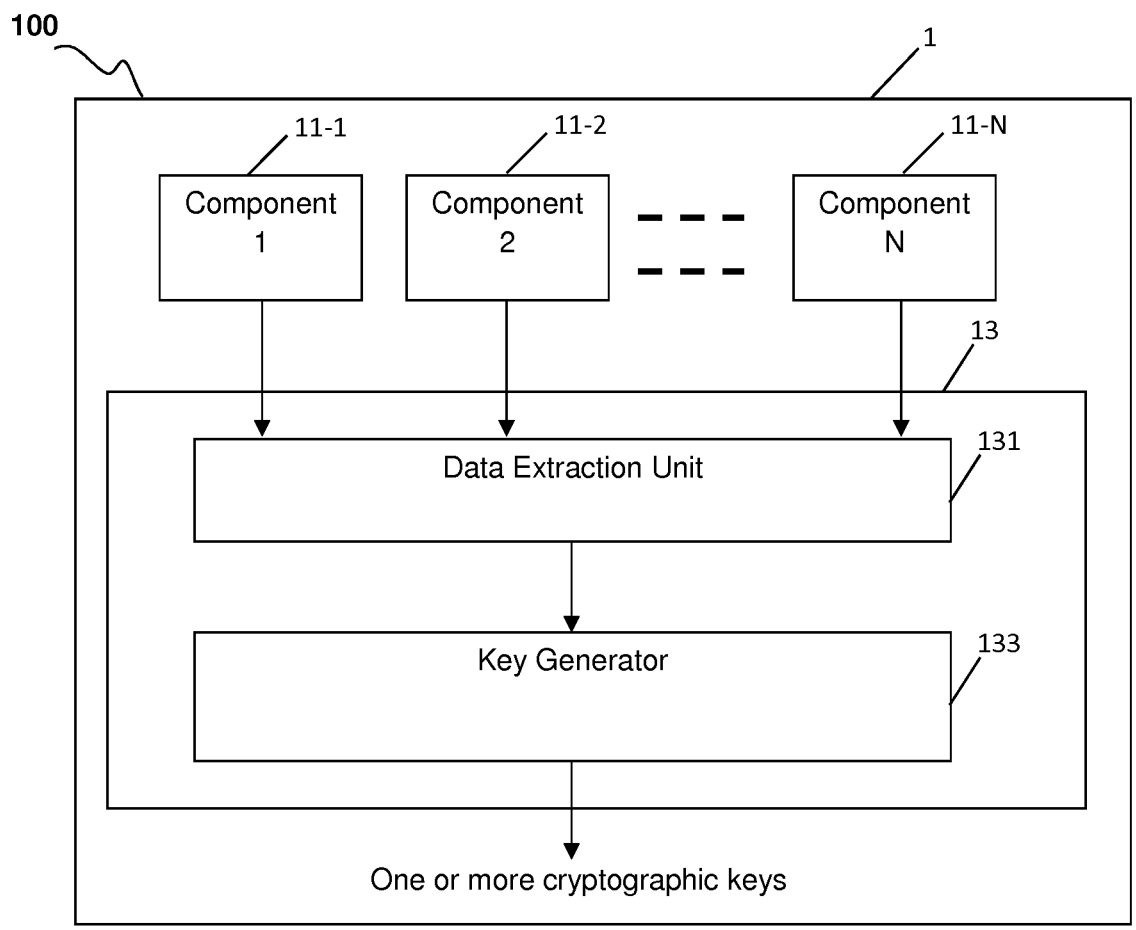
FIG. 1 is a block diagram illustrating the structure of a cryptographic, according to some embodiments of the invention.

Embodiments of the invention provide devices and methods for securing cryptographic devices against hardware and/or software attacks aiming at recovering the cryptographic keys stored in/generated by cryptographic devices. In particular, the devices and methods of the invention provide a determination of cryptographic key(s) depending on dynamic data generated dynamically at the cryptographic devices and representing a dynamic behavior of the cryptographic devices.

A cryptographic device refers to a device that implements hardware and/or software cryptographic mechanisms for ensuring data and/or signals security, authentication, protection, and/or privacy.

Secured cryptographic devices and methods according to the various embodiments of the invention may be implemented in a wide variety of devices or systems such as industrial, information, and consumer devices. Secured cryptographic devices and methods according to embodiments of the invention may be used in a wide range of applications such as civil or military communication applications or data processing applications, including for example:
- digital electronics;
- communications for ensuring a secure transfer of data over unsecure transmission channels;
- computing networks/systems for securing data center interconnections;
- cloud computing applications and cloud servers;
- communication applications (e.g. communications over wire-tap channels);
- the car industry to ensure anti-theft protection;
- service provider systems to provide restricted access;
- mobile phone devices to authenticate the control and access to batteries and accessories;
- banking industry to secure banking accounts and financial transactions;
- medicine to secure medical data and medical devices such as implantable medical devices which can be implanted within the body to treat a medical condition or to monitor the state of the functioning of some body parts (e.g. pacemakers, defibrillators to monitor and treat cardiac conditions, brain monitoring or stimulation devices such as neuro-stimulators for deep brain stimulation in cases such as epilepsy or Parkinson, drug delivery systems, biosensors);
- sensitive applications in FPGA, hardware security modules, and electronic components embedded in smartcards or electrical vehicles (Evs);
- etc.

The generation of keys at device start-up is paramount in the context of secure-boot. Security critical devices indeed need to protect themselves when they are at rest. This is because when the power is cut, attackers maybe observe with microscopes the contents of the memory, and even delayer the different metallization layers to have an easier access to the silicon for better observability. Some attackers can also attempt to modify the code in the memories. In such context, a strong defense consists in encrypting and authenticating the memories. Both operations require a cryptographic key: one for encryption and the other one for the authentication function. Such operation is known as turning "red" (sensitive) information into "black" (non-sensitive) information. However, to prevent the attacker from first attempting to read the keys, the keys shall not be easily found. Otherwise, after such step, the attacker would be able to decipher the memories or to alter them while regenerating a value authentication tag. Hence the need for a strongly protected master key. The key can be referred to as the foundation of a root-of-trust (RoT).

Referring to FIG. 1, there is shown an exemplary implementation of a secured cryptographic device 1 in a system 100.

The system 100 may be for example a communication system (e.g. digital, wired, wireless, cellular, optical, satellite, acoustic, and molecular communication system), a data processing system (e.g., online sale systems, financial systems, electronic passport systems, banking), a data storage system (e.g. databases), a recording system (e.g. magnetic and optical recording), a positioning system, etc.

The cryptographic device 1 may be any device, computer, computing machine, or embedded system, programmed and/or programmable to perform cryptographic mechanisms or algorithms involving the use, the generation and/or the storage of one or more cryptographic keys.

Exemplary cryptographic devices 10 comprise, without limitations:
- smartcards, tokens to store keys such as wallets, smartcards readers such as Automated Teller Machines (ATM) used for example in financial transactions, restricted access, telecommunications, military applications, secure communication equipments, and TV set-top boxes;
- electrical and digital electronic devices such as RFID tags and electronic keys;
- embedded secure elements;
- computers (e.g. desktop computers and laptops), tablets;
- routers, switches, printers;
- mobile phones such as smartphones, base stations, relay stations, satellites;
- Internet of Things (IoT) devices, robots, drones; and
- recorders, multimedia players, mobile storage devices (e.g. memory cards and hard discs) with logon access monitored by cryptographic mechanisms.

In an application of the invention to communication systems, the cryptographic device 1 may be fixed or mobile, configured to operate in a wired, wireless, or optical fiber-based communication network.

Further, the cryptographic device 1 may be a standalone device or may be connected to external devices, machines or systems. The cryptographic device 1 may be implemented for example in a computer networking system (using for example one or more small or large area wired or wireless access networks).

One or more tests may be implemented to test cryptographic device 1 for example in order to diagnose the serviceability and/or correct the operation of the cryptographic device 1. In particular, design tests can be performed during the design or the manufacturing of the cryptographic device 1 or during the operability of said cryptographic device 1.

A design test on the cryptographic device 1 can be performed using an external test apparatus (or 'equipment') generally referred to as 'automatic test equipment' or 'automated test equipment' (ATE). The automatic test equipment is configured to perform tests on the cryptographic device, referred to as 'the Device Under Test' (DUT), 'Equipment Under Test' (EUT), or 'Unit Under Test' (UUT). The automatic test equipment implements a processing to quickly perform measurements and analyze the test results. An automated test equipment may be a simple computer-controlled digital multi-meter, or a complicated system containing dozens of complex test instruments (real or simulated electronic test equipment) capable of automatically testing and diagnosing faults in sophisticated electronic packaged parts or on wafer testing, including system on chips and integrated circuits.

According to some embodiments of the invention, the cryptographic device 1 may be a device, computer, computing machine, or embedded system, programmed and/or programmable to execute itself one or more design test programs without relying upon external test equipment.

A design test referred to as a 'built-in self-test' (BIST) or 'built-in test' (BIT) is a mechanism that enables a machine to test itself without relying on external test equipment.

A BIST may be designed to meet several requirements comprising a high reliability, a low repair cycle, or depending on several constraints comprising limited technician accessibility and an increasing cost of testing during manufacture.

By reducing the test-cycle duration and the complexity of the test/probe setup, a BIST provides a reduction on the complexity and the costs due to the reliance upon external test equipment for testing a device/machine.

Built-in self tests are used to test the functioning of several devices and systems comprising, without limitation, devices used in automotive, in avionics, in electronics, and in medical devices.

In particular, automotive devices perform BISTs to enhance safety and reliability. For example, most vehicles with antilock brakes test them once per safety interval. If the antilock brake system has a broken wire or other fault, the brake system reverts to operating as a normal brake system. Most automotive engine controllers incorporate a 'limp mode' for each sensor so that the engine will continue to operate if the sensor or its wiring fails.

In avionics, BISTs are performed in civil and military aircrafts during the manufacturing phase or during a flight to minimize the time on the ground needed for repairing detected failing devices and to increase the level of security of the aircraft system.

Exemplary applications of BISTs in electronics comprise the BISTs performed by integrated circuits and by computers. BISTs are used in integrated circuits manufacturing to make faster, less-expensive integrated circuit manufacturing tests. Computers, including embedded systems, perform BISTs to self-test their processors and/or memory, and/or software.

In medicine, medical devices perform BISTs to test themselves for assuring a continued safety. Safety-critical devices generally define a 'safety interval', a period of time which is short enough to prevent injury from occurring. Medical devices perform a BIST of the most critical functions at least once per safety interval.

The various embodiments of the invention provide improved secured cryptographic devices in which the determination of one or more cryptographic keys depends on data generated during the performance of a built-in self-test. More specifically, the cryptographic keys generation is based on dynamic data generated by components implemented in the cryptographic device in response to the performed built-in self-test.

Referring to FIG. 1, there is shown a cryptographic key determination device 13 implemented in a cryptographic device 1 for determining one or more cryptographic keys in the cryptographic device 1. The cryptographic device 1 is configured to execute one or more test programs corresponding to a design test. The cryptographic device 1 comprises one or more components 11-$i$ for i=1, . . . , N, each component 11-$i$ being configured to generate static and dynamic data in response to the execution of the one or more test programs corresponding to the design test performed by the cryptographic device 1. The cryptographic key determination device 13 comprises:

a data extraction unit 131 configured to extract at least one part of the static data and at least one part of the dynamic data generated by the one or more components 11-$i$, and a key generator 133 configured to determine combined data by combining the extracted at least one part of static data and at least one part of dynamic data, and to determine the one or more cryptographic keys by applying a cryptographic function to the combined data.

The cryptographic device 1 may be configured to perform one or more design tests for reducing the likelihood of hardware and/or software failures by the prediction of such failures and the identification of the possible points of failures. A point of failure may occur at the processor(s) and/or at the circuitry around the processor(s) or around one or more peripheral devices and/or at the memory and/or at the software.

When a processor failure occurs, it is unlikely that any instructions will be executed. Design tests in such events are thus irrelevant. As such failures are most likely to occur on power-up, a system monitor/manager/supervisor is likely to notice and handle such failures.

In some embodiments in which the cryptographic device 1 is a multi-processor device implementing two or more processors separately on the chip in a way that the failure of one of the processors will not impact the remaining processors (a processor being a single core or a multi-core processor), the cryptographic device 1 may be configured to execute one or more test programs corresponding to one or more design tests to verify and/or identify if any failure has been occurred at one of the two or more processors or at one or more of the cores of a multi-core processor.

The results of the design tests may be displayed on a panel (that is a part of the cryptographic device 1), output to an external device connected to the cryptographic device 1, or stored for future retrieval by diagnostic tools or system monitor/manager/supervisor.

In some embodiments, the cryptographic device 1 may be configured to execute one or more test programs corresponding to a design test continuously. In such embodiments, the data extraction unit 131 may be configured to perform the extraction of at least one part of the static data and at least one part of the dynamic data generated by the one or more components 11-$i$ regularly at time intervals (specific, predefined, predetermined, or selected time intervals for example).

In some embodiments, the cryptographic device 1 may be configured to execute one or more test programs corresponding to a design test periodically according to a predefined time interval (e.g. a design test time interval). A design test interval may correspond for example to a safety interval for cryptographic devices used for example in medical applications.

In some embodiments, the execution of one or more test programs may be event-driven, the cryptographic device 1 being configured to execute one or more test programs corresponding to an event-driven design test in response to one or more event(s). Exemplary event-driven design tests comprise design tests performed at aircraft systems after the aircraft lands.

In some embodiments, the cryptographic device 1 may be configured to execute one or more test programs corresponding to a design test in response to an interrupt action or to a user-initiated action.

In some embodiments, the data extraction unit 133 may be configured to extract static and dynamic data according to a data volume threshold previously determined depending on a security level/performance level/key computation complexity and/or latency required for the generation of one or more cryptographic keys from the extracted data.

In some embodiments, the duration and/or the frequency of static and dynamic data extraction may be configurable/configured to satisfy a target performance/security tradeoff.

In some embodiments, the duration and/or the frequency of static and dynamic data extraction may be performed by a combination of at least some of the preceding features.

In some embodiments, the execution of one or more test programs may be implemented by the cryptographic device 1 to perform a system boot-up test at each system boot immediately after the cryptographic device 1 is powered on. In such embodiments, the key generator 133 may be configured to determine one or more cryptographic keys from the system boot data generated by the one or more components 11-*i* comprised in the cryptographic device 1 for securing the system boot and ensuring a secure initialization of the cryptographic device 1.

A system boot-up test may comprise one or more test programs to perform one or more of the following actions:
verify the integrity of the registers of one or more processing units (or processors) comprised in the cryptographic device 1;
verify the integrity of some components such as timers and interrupt controllers;
find, size, and verify the main memory of the cryptographic device 1;
identify, organize, and select which devices/components are available for booting;
discover, initialize, and catalog all system buses and components;
provide a user interface for the system's configuration;

In some embodiments, a successful system boot-up test may be followed by a load of an operating system and/or the initialization of one or more components referred to as 'system-boot components'. System-boot components may for example comprise peripheral devices.

Advantageously, test data may not be documented so that invasive attacks, aiming at recovering the key, will require reversing the whole chip, as the key is built by reading at various locations in the chip.

In some embodiments, the execution of one or more test programs may be implemented by the cryptographic device 1 to perform a memory test, the cryptographic device 1 being configured to perform said memory test to test one or more memory units implemented in the cryptographic device 1.

A memory test may be performed to detect/identify memory failures. A memory failure may be transient or hard. Transient failures/faults are impermanent faults that occur from time to time and are virtually impossible to prevent. Hard faults are permanent malfunctions that can show up in three forms:
1) memory not responding to being addressed at all;
2) one or more bits are stucked at '0' or '1';
3) there is cross talk; addressing one bit has an effect one or more other bits.

Memory tests may be performed by the cryptographic device 1 to detect such hard memory failures. Such memory tests may be performed at the system boot and/or during the operability of the cryptographic device 1 as a background task.

A memory test may be advantageously performed at the system boot, the time when memory is most likely to fail and thus testing the memory that does not contain yet data that may be sensitive.

A background memory test may be performed by testing individual bytes/words of memory during the operability of the cryptographic device 1 as long as interruptions in the program executions are tolerated. Such memory tests may be performed for example during idle times or as background tasks, when there are not programs/instructions being executed.

In some embodiments, the execution of one or more test programs may be implemented in the cryptographic device 1 depending on one or more test parameters, a test parameter being chosen in a group comprising a test duration and a test complexity.

In one embodiment, a component 11-*i* among the one or more components 11-*i* comprised in the cryptographic device 1 for i=1, . . . , N may be chosen in a group comprising a processor, a memory unit, a cryptographic unit, and a peripheral device.

A processor refers to a component configured to execute the instructions of one or more programs stored in memory units using one or more processing units (referred to as 'cores') by performing arithmetic, logical, control, and input/output operations specified by the instructions.

According to some embodiments, the cryptographic device 1 may be a multi-processor, comprising at least two processors 11-*i*.

In some embodiments, a processor 11-*i* may be a single core processor, comprising a single processing unit (not illustrated in FIG. 1).

In other embodiments, a processor 11-*i* may be a multi-core processor, comprising a plurality of cores configured to perform tasks at a given time (as used for example in embedded systems, digital signal processing, or graphic processing units). The tasks may be software processes or/and threads scheduled by the operating system.

In such embodiments, a processor 11-*i* may be a single computing component configured to run multiple instructions on separate cores at the same time, thereby increasing the overall speed for program execution amenable to parallel computing. The different cores may be integrated onto a single integrated circuit die (also known as a chip multiprocessor), or onto multiple dies in a single chip package.

Further, the cores in a multi-core processor 11-*i* may or may not share memory means (for instance cache memories). In some embodiments, the cores may be configured to implement message passing or shared-memory inter-core communication methods.

In embodiments in which the cryptographic device 1 is multi-processor, the cryptographic device 1 may comprise one or more single-core processors and one or more multi-core processors.

Further, in some embodiments in which the cryptographic device 1 comprises a plurality of processors 11-*i*, the processors 11-*i* may be centralized in space or distributed in space such as clusters and farms of servers.

According to some embodiments, the cryptographic device 1 may comprise at least one virtual processor 11-*i*, a virtual processor being a physical central processing unit that is assigned to a virtual machine (e.g. in cloud computing applications, cloud servers, etc).

In particular, a processor 11-*i* may comprise:
one or more processing units (not illustrated in FIG. 1) configured to execute the program instruction(s); each processing unit may comprise an arithmetic and logical unit (ALU) configured to perform arithmetic and logical operations and processor registers configured to supply operands to the ALU and store the results of ALU operations, and
a control unit (not shown in FIG. 1) configured to decode the program instructions and orchestrate/coordinate the fetching (from memory means or storage devices) and execution of instructions by directing the coordinated operations of the ALU, registers and other components of the cryptographic device 1 (for example peripheral devices).

The processor registers may form small and very fast memory means (as opposed to the slower RAM main memory) used to speed the execution of the programs by providing quick access to commonly used values. The processor registers may in particular comprise specific internal registers-registers, not accessible by instructions and used internally for processor operations only, including:
a program counter, also known as "instruction register" (not shown in FIG. 1): a program counter may indicate the position of the processor 11-*i* in its instruction sequence. A program counter may be configured to hold either the address of the instruction being executed or the address of the next instruction to be executed, depending on the specific system;
memory address register(s) (not shown in FIG. 1) configured to store the memory address from which data will be fetched to the processor 11-*i* (i.e. the memory location of the data to be loaded from memory units to the processor 11-*i*) or the address to which data will be sent for storage (i.e. the memory location in which data will be stored), and
memory data register(s) (not shown in FIG. 1) configured to store data fetched/retrieved from memory units (retrieved from the processor cache or from memory units) and ready to be processed or data waiting to be stored in other memory means.

According to some embodiments, the cryptographic device 1 may further comprise memory bus(es) configured to route data and/or metadata between the one or more components 11-*i*.

A cryptographic unit 11-*i* may be a processing or storage unit configured to generate/store/manage/use cryptographic data and cryptographic keys different from the cryptographic keys generated by the key generator 133.

The cryptographic unit 11-*i* may be a secure crypto-processor 11-*i* dedicated for carrying out cryptographic operations to protect sensitive data in memory from hardware and/or software attacks. A crypto-processor 11-*i* may be configured to perform cryptographic mechanisms for encryption, integrity, and replay protection. Advantageously, memory encryption enables protecting the confidentiality of memory-resident data, integrity protection enables preventing an attacker from causing hidden modifications to the encrypted data stored in memory, and replay protection enables eliminating undetected temporal substitution of the encrypted data. Exemplary crypto-processors comprise smartcards used for example in financial transactions, restricted access, telecommunication, military applications, secure communication equipment, Automated Teller machines, TV set-top boxes, etc.

According to some embodiments, a memory unit 11-*i* may comprise:
a data memory (not shown in FIG. 1) configured to store data;
an instructions memory (not show in FIG. 1) configured to store the instructions of the programs (comprising the instructions of the test programs); and
a metadata memory (not shown in FIG. 1) configured to store metadata associated with each memory location (corresponding to data or instructions memory locations).

In order to speed up processing of programs and reduce the average cost (time or energy) to access data from the memory unit 11-*i*, smaller and faster cache memories may be used.

Accordingly, a memory unit 11-*i* may comprise a processor cache in association with each processor implemented in the cryptographic device 1, the processor cache being configured to access the data and/or instructions comprised in the programs to be executed by the processor with which it is associated. A processor cache may be configured to store copies of the data and/or instructions from frequently requested locations in the memory unit 11-*i* so that they are immediately available to the processor(s) when needed. In particular, the data stored in a processor cache may be the result of earlier computations, or the duplicate of data stored elsewhere.

A processor cache may comprise different independent caches, including data cache(s) and/or instruction cache(s).

In some embodiments, a processor cache may be organized as a hierarchy of cache levels.

According to some embodiments, a processor cache may be located inside the processor 11-*i* chip (internal cache).

Alternatively, a processor cache may be located outside the processor 11-*i* chip (external cache).

According to some embodiments, a memory unit 11-*i* may correspond to the main memory of the cryptographic device 1.

According to some embodiments, the memory unit 11-*i* may be chosen in a group comprising volatile memories, non-volatile memories, a combination of both volatile and non-volatile memory units.

A volatile memory may use one or more of a RAM, DRAM (e.g., DDR, SDRAM) SRAM, T-RAM, and Z-RAM. Volatile memories are generally advantageous in terms of improving read/write performance, with a lower cost/footprint than non-volatile writable memories.

A non-volatile memory may use one or more of a Mask ROM, PROM, EPROM, EEPROM, NVRAM, Flash memory Solid-state storage, nvSRAM, FeRAM (Ferro-electric RAM), MRAM (Magnetic RAM), PRAM. Non— volatile memories are generally advantageous in terms of providing access to previously stored information upon reboot and/or power cycle.

According to some embodiments, a component 11-*i* comprised in the cryptographic device 1 may be an internal or external peripheral device including input devices, output devices, and input/output.

Input devices may be configured to interact with or send data from the user to the computer. Exemplary input devices comprise keyboards, computer mice, graphic tablets, barcode readers, image scanners, microphones, webcams, game controllers, light pens, and digital cameras.

Output devices may be configured to provide output to the user from the cryptographic device 1. Exemplary output devices comprise computer displays, printers, projectors, computer speakers, webcams.

Input/Output devices may be configured to perform both functions. Exemplary Input/Output devices comprise touchscreens.

In some embodiments, the key generator 123 may be a random number generator or a physically unclonable function.

In some embodiments, a random number generator may be chosen in a group comprising a pseudo-random number generator and a true random number generator.

According to some embodiments, the cryptographic device 1 may be configured to use the one or more cryptographic keys determined by the key generator 133 in one or more applications comprising data encryption, data decryption, message authentication, and digital signatures.

Data encryption may use one or more encryption mechanisms implementing one or more of error correcting codes (for example Hamming codes, BCH codes), hash functions, and secret key-based cryptographic algorithms (using symmetric or asymmetric keys).

Symmetric encryption algorithms may be chosen in a group comprising DES (Data Encryption Standard), 3DES, AES (Advanced Encryption Standard), and RC4 (Rivest Cipher 4).

Asymmetric encryption algorithms may be chosen in a group comprising RSA (Rivest-Shamir-Adleman) and ECDSA (Elliptic Curve Digital Signature Algorithm).

In some embodiments, the encryption and decryption algorithms may be chosen based on trade-offs between performance, memory, and the security level required by an application and/or a defined user.

The key generator 133 may be configured to determine one or more cryptographic keys depending on one or more secret parameters such as a password or an external secret value for example shared between the cryptographic device 1 and one or more external devices/machines/users connected to the system 100 with the purpose of sharing the one or more cryptographic keys determined by the cryptographic device 1.

In one embodiment, the one or more cryptographic keys may be stored within the cryptographic device, shared within the cryptographic device, shared with external devices, shared with other systems (such as user systems).

The cryptographic key(s) may be destroyed on reboots and/or on shutdown, and initialized (in a deterministic or random way) at the initialization of the cryptographic device 1.

Figure 2:
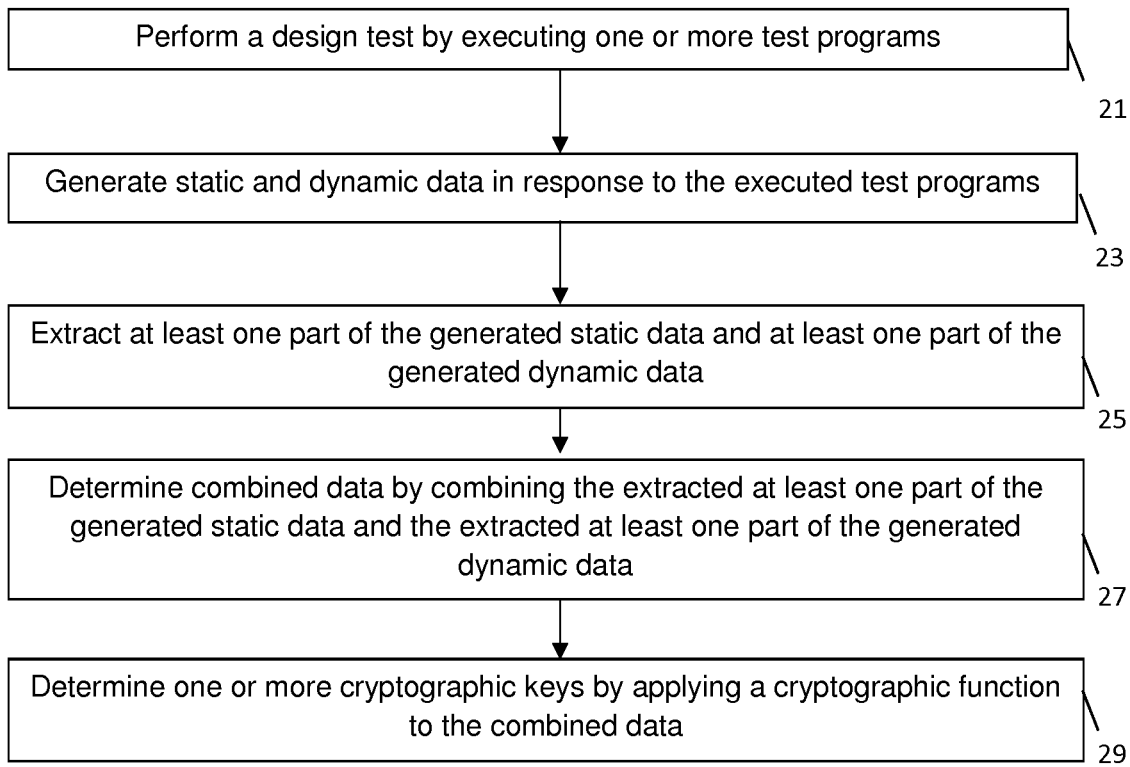
FIG. 2 is a flowchart illustrating a method of determining one or more cryptographic keys from static and dynamic data generated in response to the execution of one or more test programs.

Referring to FIG. 2, there is shown a method for determining one or more cryptographic keys, the method comprising:

performing, at step 21, a design test by executing one or more test programs;
generating, at step 23, static and dynamic data in response to the performed design test;
extracting, at step 25, at least one part of the generated static data and at least one part of the generated dynamic data;
determining, at step 27, combined data by combining the extracted at least one part of the generated static data and the extracted at least one part of the generated dynamic data; and
determining, at step 29, the one or more cryptographic keys by applying a cryptographic function to the combined data.

One or more design tests may be performed to predict/prevent/identify any hardware or software failure.

One or more test programs corresponding to a design test may be executed continuously or periodically according to a predefined design test time interval or in response to one or more events or in response to an interrupt action or to a user-initiated action.

In some embodiments, the extractions of static and dynamic data may be performed according to a data volume threshold previously determined depending on a security level/performance level/key computation complexity and/or latency required for the generation of one or more cryptographic keys from the extracted data.

In some embodiments, the duration and/or the frequency of static and dynamic data extraction may be configurable/configured to satisfy a target performance/security tradeoff.

In some embodiments, the duration and/or the frequency of static and dynamic data extraction may be performed by a combination of at least some of the preceding features.

In some embodiments, a design test may be a system boot-up test performed at each system boot.

In some embodiments, a design test may be a memory test performed to detect/identify memory failures.

In some embodiments, a design test may be performed according to one or more design test parameters. The design test parameter may be a test duration (also referred to as 'design test duration') or a test complexity (also referred to as 'design test complexity').

In some embodiments, the one or more cryptographic keys may be determined using a cryptographic function, which may be a random number generator or a physically unclonable function.

In some embodiments, the random number generator may be a pseudo-random number generator or a true random number generator.

In some embodiments, the one or more cryptographic keys may be used in one or more applications including data encryption, data decryption, message authentication, and digital signatures.

Data encryption may use one or more encryption mechanisms implementing one or more of error correcting codes (for example Hamming codes, BCH codes), hash functions, and secret key-based cryptographic algorithms (using symmetric or asymmetric keys).

Symmetric encryption algorithms may be chosen in a group comprising DES, 3DES, AES, and RC4.

Asymmetric encryption algorithms may be RSA or ECDSA.

In some embodiments, the encryption and decryption algorithms may be chosen as a function of the desired tradeoffs between the performance, the memory, and the security level required by an application and/or a defined user.

In some embodiments, the one or more cryptographic keys may be determined depending on one or more secret parameters such as a password or an external secret value.

In some embodiments, the determined one or more cryptographic keys may be stored for a further use/share/distribution.

The methods described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions specified herein.

While embodiments of the invention have been illustrated by a description of various examples, and while these embodiments have been described in considerable details, it is not the intent of the applicant to restrict or in any way limit the scope of the appended claims to such embodiments. Some of those embodiments may be advantageously combined, when appropriate. Additional advantages and modifications will readily appear to those skilled in the art. The invention in its broader aspects is therefore not limited to the specific details, representative methods, and illustrative examples shown and described.

The invention claimed is:

1. A cryptographic key determination device for determining one or more cryptographic keys in a cryptographic device, the cryptographic device being configured to execute one or more test programs, the cryptographic device comprising one or more components, each component being configured to generate static and dynamic data, said dynamic data being generated in response to the execution of said one or more test programs and representing a dynamic behavior of said cryptographic device, wherein the cryptographic key determination device comprises:
   a data extraction unit configured to extract at least one part of the static data and at least one part of the dynamic data generated by said one or more components according to a data volume threshold previously determined depending on one or more of a security level, a performance level, a key computation complexity, and a latency required for the generation of one or more cryptographic keys from the extracted data, and
   a key generator configured to combine said at least one part of static data and said at least one part of dynamic data, and to determine said one or more cryptographic keys by applying a cryptographic function to said combined data.

2. The cryptographic device of claim 1, wherein the cryptographic device is configured to execute said one or more test programs continuously.

3. The cryptographic device of claim 1, wherein the cryptographic device is configured to execute said one or more test programs periodically according to a predefined time interval.

4. The cryptographic device of claim 1, wherein the execution of said one or more test programs is event-driven, the cryptographic device being configured to execute said one or more test programs in response to one or more events.

5. The cryptographic device of claim 1, wherein the cryptographic device is configured to execute said one or more test programs in response to an interrupt action or to a user-initiated action.

6. The cryptographic device of claim 1, wherein said execution of one or more test programs is implemented by the cryptographic device to perform a system boot-up test, the cryptographic device being configured to execute said one or more test programs at each system boot.

7. The cryptographic device of claim 1, wherein said execution of one or more test programs is implemented by the cryptographic device to perform a memory test for testing one or more memory units implemented in said cryptographic device.

8. The cryptographic device of claim 1, wherein said execution of one or more test programs is implemented depending on one or more test parameters, a test parameter being chosen in a group comprising a test duration and a test complexity.

9. The cryptographic device of claim 1, wherein a component of said one or more components is a processor or a memory.

10. The cryptographic device of claim 1, wherein said key generator is a random number generator or a physically unclonable function.

11. The cryptographic device of claim 1, wherein the cryptographic device is configured to use said one or more cryptographic keys in one or more applications comprising data encryption, data decryption, message authentication, and digital signatures.

12. The cryptographic device of claim 11, wherein data encryption is performed using a symmetric encryption algorithm chosen in a group comprising DES, 3DES, AES, and RC4.

13. The cryptographic device of claim 11, wherein data encryption is performed using an asymmetric encryption algorithm, said asymmetric encryption algorithm being RSA or ECDSA.

14. The cryptographic device of claim 1, wherein said one or more cryptographic keys are stored within the cryptographic device or shared within the cryptographic device or shared with external devices or shared with external systems.

15. A method for determining one or more cryptographic keys, the method comprises:
   executing one or more test programs;
   generating static and dynamic data, said dynamic data being generated in response to the execution of said one or more test programs and representing a dynamic behavior of said cryptographic device,
   wherein the method comprises:
   extracting at least one part of said static data and at least one part of said the dynamic data according to a data volume threshold previously determined depending on one or more of a security level, a performance level, a key computation complexity, and a latency required for the generation of one or more cryptographic keys from the extracted data;
   combining said at least one part of static data and said at least one part of dynamic data; and
   determining said one or more cryptographic keys by applying a cryptographic function to said combined data.

* * * * *